United States Patent Office 3,803,157
Patented Apr. 9, 1974

3,803,157
2-AMINO-1-(2-IMIDAZOLIN-2-YL)-2-IMIDAZOLINES
Raymond R. Wittekind, Morristown, and John Shavel, Jr., Mendham, N.J., assignors to Warner-Lambert Company, Morris Plains, N.J.
No Drawing. Continuation-in-part of application Ser. No. 6,639, Jan. 28, 1970, now Patent No. 3,666,767, dated May 30, 1972. This application May 15, 1972, Ser. No. 252,991
The portion of the term of the patent subsequent to May 30, 1989, has been disclaimed
Int. Cl. C07d 31/40
U.S. Cl. 260—296 R                 4 Claims

ABSTRACT OF THE DISCLOSURE

The present invention relates to 2-amino-1-(2-imidazolin-2-yl)-2-imidazolines, the free base of which has the following structural formulas:

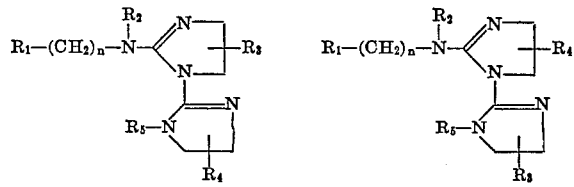

wherein:

$R_1$ is hydrogen, lower alkyl, cycloalkyl, aryl, substituted aryl, heterocyclic, substituted heterocyclic or aryloxy;
$R_2$ is hydrogen, lower alkyl, aryl and substituted aryl; or $R_1$ and $R_2$ taken together with the nitrogen atom to which they are attached form a heterocyclic ring;
$R_3$ and $R_4$ are hydrogen, lower alkyl, aryl, or substituted aryl;
$R_5$ is hydrogen, lower alkyl, aryl or substituted aryl;
$n$ is an integer from 0 to 10.

---

The compounds of this invention are useful an antiarrhythmic agents as well as antibacterial agents.

This application is a continuation-in-part of our co-pending application, U.S. Ser. No. 6,639, filed Jan. 28, 1970, now U.S. Pat. No. 3,666,767, issued May 30, 1972.

The present invention relates to 2-amino-1-(2-imidazolin-2-yl)-2-imidazolines having the following structural formulas:

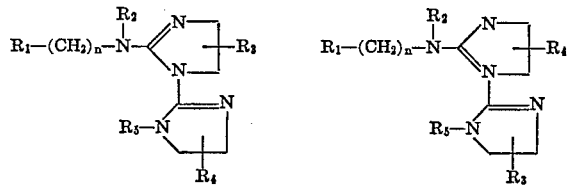

wherein:

$R_1$ is hydrogen, lower alkyl, cycloalkyl, heterocyclic, substituted heterocyclic, aryl, substituted aryl, or aryloxy;
$R_2$ is hydrogen, lower alkyl, aryl, substituted aryl, or $R_1$ and $R_2$ taken together with the nitrogen atom to which they are attached form a heterocyclic ring, for example, a 5- or 6-membered ring;
$R_3$ and $R_4$ are hydrogen, lower alkyl, aryl or substituted aryl;
$R_5$ is hydrogen, lower alkyl, aryl or substituted aryl;
$n$ is an integer from 0 to 10.

In the definitions for $R_1$, $R_2$, $R_3$, $R_4$, and $R_5$, the term "lower alkyl" includes lower aliphatic hydrocarbons having 1 to 10 carbon atoms in the carbon chain. It includes straight chain as well as branched chain radicals. The term also includes, for example, methyl, ethyl, propyl, isopropyl, butyl, isobutyl and the like. The term "cycloalkyl" encompasses saturated monocyclic groups having from 3 to 8 carbon atoms, such as cyclopropyl, cyclobutyl, cyclopentyl, cyclohexyl, cycloheptyl, and cyclooctyl. The term "heterocyclic" encompasses the monocyclic 5- and 6- membered hetero rings having at least one hetero atom in the ring which may be either nitrogen, oxygen or sulfur. Representative heterocyclics falling within this definition are, for example, aziridinyl, azetidinyl, pyrrolyl, pyrrolidinyl, morpholino, thienyl, furyl, pyridyl, piperidyl, indolyl, and the like. Additionally, these 5- and 6-membered heterocyclics may have further substituents in their ring portions by groups such as, hydrogen, halogen, lower alkyl and lower alkoxy. The term "aryl" denotes a monocyclic or bicyclic hydrocarbon radical, preferably of 6 to 10 carbon atoms, such as for example, phenyl, naphthyl and the like. The term "substituted aryl" as used herein includes aryl as defined above in which one or more of the hydrogen atoms of the aryl portion have been substituted by groups such as, halogen, hydroxyl, lower alkyl, trifluoromethyl, amino, substituted amino or lower alkoxy. X, in the formulas below, includes anions such as the halides, for example, fluoride, chloride, iodide, bromide, or other anions such as, sulfate, nitrate, phosphate, maleate, fumarate and the like.

The definitions for $R_1$, $R_2$, $R_3$, $R_4$ and $R_5$, and $n$ as used hereinafter have the same meanings as defined above.

The compounds of this invention exhibit anti-arrhythmic activity, for example, at a dosage of about 2 to 3 mg./kg., body weight in a mammal such as, cats, dogs, monkeys, and the like. In experimentally induced arrhythmia, such as those induced by ouabain, at a dosage of 2 to 3 mg./kg., the compounds of this invention are capable of arresting such arrhythmia. Generally speaking, the compounds of this invention are useful in conditions associated with cardiac arrhythmia. A dosage level of about 1 to 10 mg., several times daily is recommended. This dosage regimen can be varied according to body weight, sex and species of the mammal being treated.

Among the dosage forms which can be used to administer these compounds are, for example, tablets, powders, elixirs, suspensions and the like. These dosage forms are formulated by procedures known to the pharmacist's art.

All the compounds of this inveniton also exhibit antibacterial activity against gram positive cocci, such as Staphylococcus aureus or gram negative bacilli, such as E. coli. To use the compounds as anti-bacterials, they are formulated from 1 to 10% by weight with a dermatologically acceptable vehicle, such as talc, petrolatum and applied liberally to the site infected with the susceptible bacteria.

The preferred genus has the following structural formula:

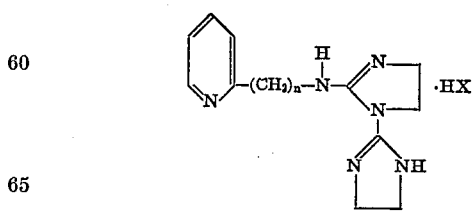

1 where $n=0$ to 3, $x=$an anionic group such as halide, fumarate, maleate and the like.

These compounds are prepared as follows:

(A) 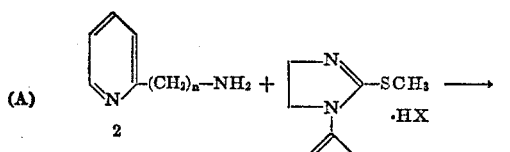

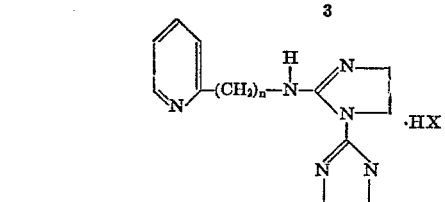

(B) 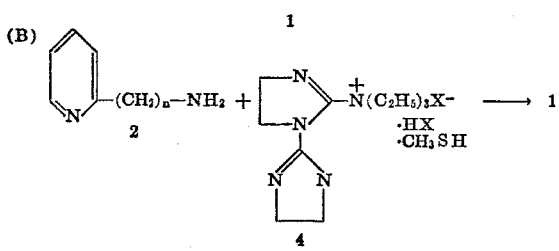

where n and X have the above meaning.

2-propanol and acetonitrile are useful solvents for these processes.

The pyridylamines 2 are available from Aldrich Chemical Company and can be prepared by methods described in Synthetic Organic Chemistry by R. B. Wagner and H. D. Zook, John Wiley and Sons, Inc., New York, N.Y., 1953, p. 653 and p. 832.

1-(2-imidazolin-2-yl)-2-(methylthio) - 2 - imidazoline hydroiodide 3 and triethyl[1 - (2-imidazolin-2-yl)-2-imidazolin - 2 - yl)]ammonium iodide hydroiodide methanethiol 4 are prepared by the processes outlined below where n and X have the meaning defined in a preceding paragraph.

(C) 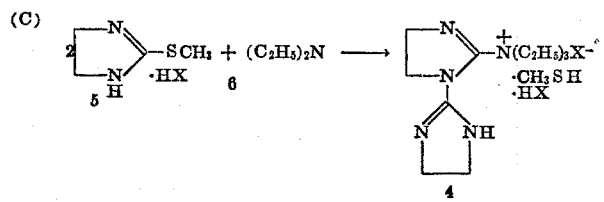

(D) 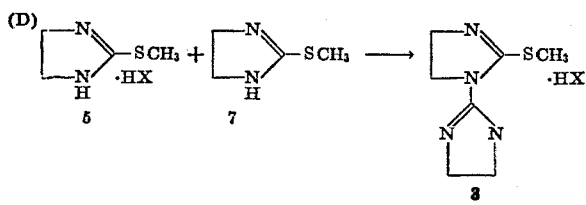

The solvents are 2-propanol and acetonitrile.

2-methylmercaptoimidazol-2-ine 7 and the corresponding hydrohalide 5 are prepared by methods reported by S. R. Aspinall and E. J. Bianco, J. Org. Chem., 73, 602 (1951), W. Wilson, J. Chem. Soc., 13, 89 (1955) and A. L. Langis and F. Herr, Can. 736, 494 (June 14, 1966); C. A., 65, 12212 (1966).

To further illustrate the practice of this invention, the following examples are included:

EXAMPLE 1

1-(2-imidazolin-2-yl)-2-{[2 - (2-pyridyl)ethyl]amino}-2-imidazoline hydroiodide.—A solution of 2-(2-aminoethyl)pyridine (3.91 g., 0.0320 mole), 1-(2-imidazolin-2-yl)-2-(methylthio) - 2 - imidazoline hydroiodide (9.98 g., 0.0320 mole) and freshly distilled (from calcium hydride)-2-propanol (150 ml.) was heated under reflux for three hours while a slow stream of nitrogen was bubbled through the reaction mixture. The reaction mixture was allowed to cool to room temperature. The resulting solid was collected and recrystallized from 2-propanol (three times); yield, 3.77 g. (30.6%) of the imidazoline, M.P. 153.0–154.0°.

Analysis.—Calc'd for $C_{13}H_{14}IN_6$ (percent): C, 40.43; H, 4.96; I, 32.86; N, 21.76. Found (percent): C, 40.69; H, 5.02; I, 32.99; N, 21.94.

EXAMPLE 2

2-({[1-(2-imidazolin-2-yl)-2-imidazolin - 2 - yl]amino} methyl)pyridine hydroiodide.—A solution of 2 - aminomethylpyridine (3.61 g., 0.0330 mole), triethyl[1-(2-imidazolin - 2-yl)-2-imidazolin-2-yl]ammonium iodide hydroiodide methanethiol (18.0 g., 0.0330 mole) and freshly distilled (from calcium hydride) 2-propanol (110 ml.) was heated under reflux for two hours while a slow stream of nitrogen was bubbled through the reaction mixture. The precipitate was collected and recrystallized from 90% 2-propanol-water; yield 6.05 g. (50.0%) of the imidazoline hydroiodide, M.P. 193.0–194.0° dec.

Analysis.—Calc'd for $C_{12}H_{17}IN_6$ (percent): C, 38.72; H, 4.60; I, 34.09; N, 22.58. Found (percent): C, 38.88; H, 4.68; I, 33.97; N, 22.57.

EXAMPLE 3

2-{[1-(2-imidazolin-2-yl)-2-imidazolin - 2 - yl]amino} pyridine hydroiodide.—A solution of 2-aminopyridine (7.05 g., 0.0750 mole), triethyl[1-(2-imidazolin-2-yl)-2-imidazolin-2-yl]ammonium iodide hydroiodide methanethiol (40.6 g., 0.0750 mole) and acetonitrile (distilled from calcium hydride, 400 ml.) was heated under reflux under an atmosphere of nitrogen for 141 hours and allowed to cool to room temperature. The solid was collected and recrystallized (two times) from methanol; yield 6.50 g. (24.0%) of the imidazolinylimidazoline, M.P. 264.5–265.0° dec.

Analysis.—Calc'd for $C_{11}H_{15}N_6I$ (percent): C, 36.89; H, 4.22; N, 23.46; I, 35.43. Found (percent): C, 37.16; H, 4.52; N, 23.30; I, 35.46.

We claim:

1. A compound of the formula:

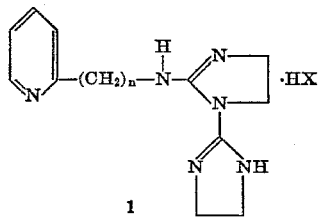

wherein n is 0 to 3 and X is an anion derived from pharmaceutically acceptable monobasic acid.

2. A compound according to claim 1 which is 1-(2-imidazolin-2-yl)-2-{[2-(2-pyridyl)ethyl]amino} - 2 - imidazoline hydroiodide.

3. A compound according to claim 1 which is 2-{[1-(2-imidazolin-2-yl)-2-imidazolin-2-yl]amino}pyridine hydroiodide.

4. A compound according to claim 1 which is 2-({[1-(2-imidazolin-2-yl)-2-imidazolin - 2 - yl]amino}methyl) pyridine hydroiodide.

References Cited

UNITED STATES PATENTS 3,666,767  5/1972  Wittekind et al. _____ 260—296 R

ALAN L. ROTMAN, Primary Examiner

U.S. Cl. X.R.

260—247.5, 293.7, 295 S, 309.6; 424—248, 263, 267, 273